No. 660,942. Patented Oct. 30, 1900.
G. L. ALLEN.
VEHICLE TIRE.
(Application filed Mar. 2, 1900.)
(No Model.)
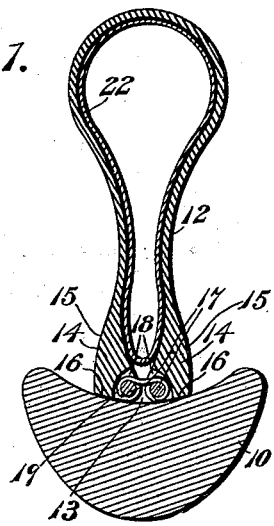
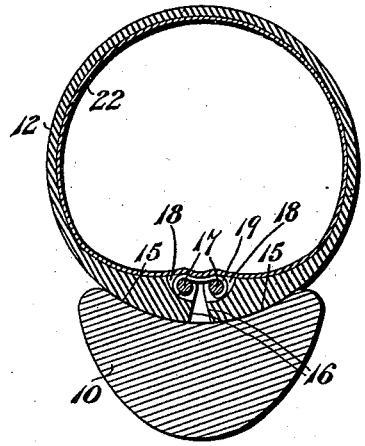
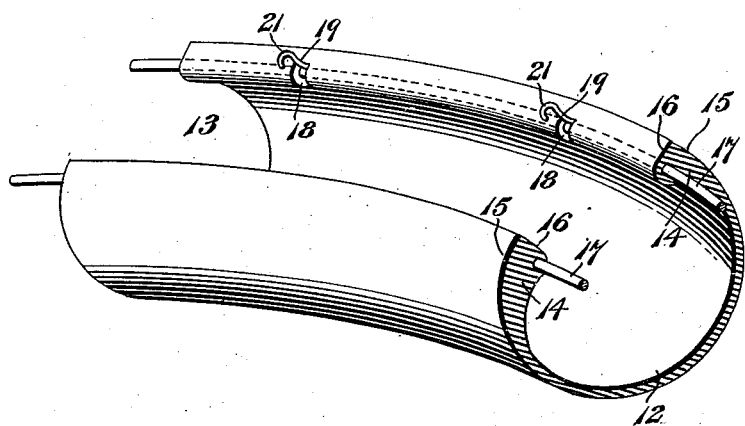
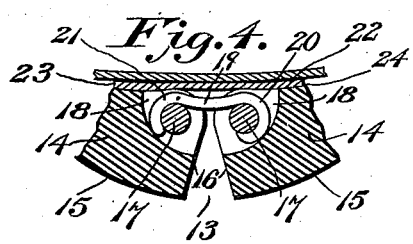
George L. Allen
By
Inventor
Witnesses
Edwin G. McKee
Attorney
THE NORRIS PETERS CO., PHOTO-LITHO., WASHINGTON, D. C.

UNITED STATES PATENT OFFICE.

GEORGE L. ALLEN, OF BRADFORD, PENNSYLVANIA.

VEHICLE-TIRE.

SPECIFICATION forming part of Letters Patent No. 660,942, dated October 30, 1900.

Application filed March 2, 1900. Serial No. 7,113. (No model.)

*To all whom it may concern:*

Be it known that I, GEORGE L. ALLEN, a citizen of the United States, residing at Bradford, in the county of McKean and State of Pennsylvania, have invented a new and useful Vehicle-Tire, of which the following is a specification.

The cycle industry demands a detachable tire for an ordinary crescent-shaped rim which admits of the replacement of a single-tube or hose-pipe tire by a double-tube tire without subjecting the owner to the expense of a pair of rims specially made for all detachable tires, which rims are quite heavy owing to the excessive strain and pressure on the walls of the rim or to weakness of the rim due to the bad shape in which it has to be made in order that the case-retaining bands or wires may be fitted to the rim.

The objects of this invention are to provide a double-tube tire which is applicable to an ordinary or crescent-shaped rim without the use of cement, which provides for the expeditious application and removal of the tire to and from the rim, which holds itself securely on the rim by the action of the bands or wires that are expanded by the pressure of the tire-inflating medium, which will not be displaced from the rim in the event of puncture, so that when riding downhill the tire cannot fly off or become entangled with the spokes or sprocket to result in danger of throwing the rider, and which is beneficial to the rim in event of puncture and release of the inflating medium, because the tire forms a cushion to support the rim and the machine until the puncture can be repaired and the tire again inflated.

Further objects and advantages of the invention will appear in the course of the subjoined description, and the novel combination of elements and construction of parts will be defined in the claims.

In the drawings, Figure 1 is a cross-sectional view through a double-tube tire embodying my invention and applied in a deflated condition to an ordinary crescent-shaped wheel-rim. Fig. 2 is a similar view through the tire in its inflated condition. Fig. 3 is a perspective view of a part of the outer casing inverted, showing it equipped with retaining-bands and fasteners therefor. Fig. 4 is an enlarged detail view through the two bands and one fastener.

The same numerals of reference are used to indicate like and corresponding parts in each of the several figures of the drawings.

10 designates a wheel-rim which in cross-section is crescent-shaped, similar to ordinary rims used in connection with single-tube or hose-pipe tires, said rim being provided with a concave seat-face 11.

The double-tube tire of my invention contemplates the employment of an outer casing 12, which is divided longitudinally, as at 13, on the edge or face which is adapted to be seated on the concave face 11 of the rim. One of the important features in the construction of this outer casing consists in thickening or enlarging the edges along the line of division, so as to form the bearing-shoes 14. In the process of making the outer casing the rubber and fabric layers comprising said casing are built up, so as to increase the thickness along both edges of the line of division, so as to form the shoes, and each shoe is provided with a rounded outer face 15, the arc of which conforms to the curvature of the concave rim-seat 11; but the end edge or face 16 is straight, so as to lie at an angle to the rounded outer face.

17 designates the bands or wires, which are embedded in the thickened shoes of the outer casing, so as to lie at the angle or corner formed by the juncture of the straight end edges 16 and the inner surface of the casing 12. The thickened shoes of said outer casing are provided at intervals with notches 18, arranged in series throughout the length of the casing, and these notches accommodate the series of fasteners 19, the latter arranged to span the space or division between the thickened shoes of the casing and to engage with the two bands 17 at intervals. These bands may be made of spring-wire circular in cross-section or of any other material and of cross-sectional shape suitable for the purpose, said bands being exposed when the tire is deflated through the notches 18 in the thickened shoes. Each fastener 19 is made of a single piece of metal, preferably of wire, which is bent at one end into more than a half-circle, so as to form a clasp 20, the latter adapted to be slipped over one of the bands 17 in a manner to permanently hold the fastener thereon and at the same time enable said fastener to turn freely on the band whenever it is desired to connect or release the edges of the outer casing. The fastener is furthermore provided at its outer or free end with a hook 21, which is adapted to be turned so as to pass or fit in the notched edge of the outer casing which contains the disengaged band, said hook being arranged to take over the said disengaged band, whereby the fastener serves to connect the two bands, substantially as shown by Figs. 1 and 2 of the drawings.

The inner tube 22 of the tire may be of the kind ordinarily employed in double-tube tires; but as this inner tube has no special relation to the construction of the tire contemplated by this invention I have not considered it necessary to specifically describe the same nor to illustrate it in detail.

In the application of the improved tire to an ordinary wheel-rim the hooks 21 of the fasteners are disengaged from one of the bands, while the outer casing is removed from the rim, and these hooks are then turned on the other band for the divided edges of the outer casing to be separated and to enable the inner tube to be readily placed within the casing. The fasteners are now adjusted for the hooks thereof to engage with the disengaged band, and the tire is in a collapsed or deflated condition, ready for application to the wheel-rim. In this condition of the tire the two bands 17 lie quite close together and the straight end edges 16 of the thickened shoes forming a part of the outer casing are presented to view. The tire is applied to the wheel-rim for the straight outer faces 16 to rest upon the concave seat 11 of the rim at the central portion thereof, substantially as shown by Fig. 1. The inner tube is now inflated through an ordinary valve (not shown) and by any suitable means, and such inflation of the inner tube expands the same, so as to exert pressure in all directions against the outer casing 12. The operation of inflating and expanding the inner tube causes the outer casing to gradually assume a circular cross-sectional appearance, whereby the thickened shoes of said outer casing are turned so as to shift the points of contact between the shoes and the rim from the straight outer faces 16 to the curved faces 15, this change in the condition in the outer casing being shown by Figs. 1 and 2. The changed position of the shoes forming a part of the outer casing shifts the relation of the bands 17 to the seat of the rim and to each other, whereby the bands are moved outwardly from the concave seat and spread laterally in order to expand the elastic bands and make them exert pressure upon the shoes, so that the tire-casing will closely and frictionally hug the wheel-rim.

From the foregoing description, taken in connection with Figs. 1 and 2, it will be apparent that the outer casing is made to frictionally grip or hug the wheel-rim by the action of the elastic bands, which are controlled solely by the inflation or deflation of the tire. The engagement between the wheel-rim and the outer casing is so close or intimate as to prevent the tire from displacement circumferentially on the rim, thus overcoming the objection as to creeping of the tire on the wheel.

My improved double-tube tire may be used in connection with an ordinary wheel-rim without the employment of cement. The entire tire may be removed from the rim or applied thereto within a very short space of time; in fact, within less time than any other tire known to me. In the event of deflation due to puncturing of the tire it will not become displaced from the wheel, because the bands and the fasteners hold the tire in a position for the outer faces 15 to remain in contact with the rim and for the inner flat faces 16 to remain in engagement with each other. Under these conditions the collapsed or deflated tire serves as a cushion for the wheel, which prevents the rim from striking the ground when the wheel is ridden in a deflated condition, as when descending a hill, and until the rider can dismount, repair the puncture, and again inflate the tire. As the tire cannot become displaced from the wheel-rim and as it serves when deflated as a cushion for the rim, there is no possibility of the tire catching in the spokes or sprocket-gearing, the result of which would be to throw the rider forcibly from the wheel.

In Fig. 4 I have shown a strip 23 of flexible material, such as rubber or canvas, which is cemented at one of its edges 24 to the inner edge of the outer casing 12 and extends around the inner side of such casing. This strip covers the meeting edges of the casing 12 and the fastening devices 19, so that a smooth surface is presented to the inner tube 22 and there is not as much liability of the inner tube becoming worn or chafed.

It is evident that any suitable valve may be connected in a proper way to the tire.

While the invention has been described throughout the specification as being used in connection with bicycles, it is to be understood that it is not to be limited to this class, as it may be used with equal advantage upon a great many other kinds of vehicles.

Changes within the scope of the appended claims may be made in the form and proportion of some of the parts, while their essential features are retained and the spirit of the invention is embodied. Hence I do not desire to be limited to the precise form of all the parts as shown, reserving the right to vary therefrom.

Having thus described the invention, what I claim is—

1. A tire comprising a divided tube, retaining-bands located within the tire structure adjacent to the inner corners of the tube edges, and fastening means for holding said bands in fixed spaced relation and permitting of the rotative movement of the unconnected tire edges, whereby the edges of the deflated tire are presented to the wheel-rim, and which edges, upon inflation of the tire, rotate upon the bands as axes to present the periphery of said tire to the wheel-rim.

2. A tire comprising a divided tube, retaining-bands located within the tire structure adjacent to the inner corners of its edges, and a series of fasteners intermediate of, and connected loosely to, the bands, whereby the edges of the deflated tire are presented to the wheel-rim and which edges upon inflation of the tire, rotate upon the bands as axes to present the periphery of said tire to the wheel.

3. A tire comprising a casing or tube divided along one edge and thickened immediately adjacent to the line of division to form shoes having straight end faces and transversely-curved outer faces, and connecting means intermediate of the shoes and having pivotal connection with each of said shoes at points adjacent to the inner ends of the straight faces, and retaining-bands extending through the shoes at points nearer the end faces than the curved outer faces, such organization serving to effect the distention of the retaining-bands when the tire is inflated.

4. A tire comprising a divided casing or tube thickened along the edges of the division to form shoes having straight end faces, and correspondingly-curved outer side faces extending from the end faces, elastic retaining-bands, coextensive with the shoes and embedded therein adjacent to the contiguous ends of the straight end faces, and transverse fastening devices pivotally connected at their opposite ends to the retaining-bands at intervals, whereby the straight end faces of the shoes may be practically alined to facilitate the placing of the tire upon a rim and whereby the inflation of the tire will automatically effect the apposition of the straight faces and will serve to distend the elastic retaining-bands.

In testimony that I claim the foregoing as my own I have hereto affixed my signature in the presence of two witnesses.

GEORGE L. ALLEN.

Witnesses:
CLYDE A. FRANK,
WILLIAM DOBIE.